United States Patent
Fujita et al.

(10) Patent No.: US 10,564,032 B2
(45) Date of Patent: Feb. 18, 2020

(54) VIBRATION MODE DETERMINING APPARATUS

(71) Applicant: Mitsubishi Electric Corporation, Chiyoda-ku (JP)

(72) Inventors: Tomoya Fujita, Tokyo (JP); Kotaro Nagaoka, Tokyo (JP); Takeshi Tsuda, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 236 days.

(21) Appl. No.: 15/325,491

(22) PCT Filed: Jul. 21, 2015

(86) PCT No.: PCT/JP2015/070722
§ 371 (c)(1),
(2) Date: Jan. 11, 2017

(87) PCT Pub. No.: WO2016/039020
PCT Pub. Date: Mar. 17, 2016

(65) Prior Publication Data
US 2017/0176244 A1    Jun. 22, 2017

(30) Foreign Application Priority Data
Sep. 10, 2014  (JP) ................. 2014-184652

(51) Int. Cl.
G01H 17/00      (2006.01)
G01M 7/02       (2006.01)

(52) U.S. Cl.
CPC .............. *G01H 17/00* (2013.01); *G01M 7/02* (2013.01); *G01M 7/022* (2013.01)

(58) Field of Classification Search
CPC ......... G01H 17/00; G01M 7/022; G01M 7/02
See application file for complete search history.

(56) References Cited

U.S. PATENT DOCUMENTS

| | | | | |
|---|---|---|---|---|
| 4,181,029 A | * | 1/1980 | Talbott, Jr. ............ | G01M 7/022 702/113 |
| 6,822,415 B1 | * | 11/2004 | Komiya ................. | H02P 29/50 318/560 |

(Continued)

FOREIGN PATENT DOCUMENTS

| CN | 1502067 A | 6/2004 |
|---|---|---|
| JP | 3-218421 A | 9/1991 |

(Continued)

OTHER PUBLICATIONS

International Search Report dated Oct. 13, 2015 in PCT/JP2015/070722 filed Jul. 21, 2015.

(Continued)

*Primary Examiner* — Stephanie E Bloss
(74) *Attorney, Agent, or Firm* — Oblon, McClelland, Maier & Neustadt, L.L.P.

(57) ABSTRACT

A vibration mode determining apparatus that determines vibration mode of a machine structure of a machine including motors and that includes a vibration command generating unit that generates a vibration command for the motor; a control unit that generates a current command for the motor according to the vibration command and outputs a conversion value for a motor excitation force to a vibration mode calculating unit; a motor drive unit that receives the motor current command and drives the motor; a vibration sensor that detects vibration of the machine structure; a measurement-point information input unit that sets information about the attachment point of the vibration sensor; a vibration mode calculating unit that calculates the vibration mode using the conversion value for the motor excitation force and the output of the vibration sensor; and a vibration mode output unit that outputs the vibration mode.

22 Claims, 11 Drawing Sheets

(56) References Cited

U.S. PATENT DOCUMENTS

| | | | |
|---|---|---|---|
| 7,072,777 B1* | 7/2006 | Wakui | F16F 15/02 |
| | | | 702/109 |
| 2005/0082993 A1* | 4/2005 | Morishita | G05D 19/02 |
| | | | 318/114 |
| 2010/0204881 A1* | 8/2010 | Muragishi | F16F 7/1005 |
| | | | 701/36 |
| 2012/0031193 A1* | 2/2012 | Adams | G01L 25/00 |
| | | | 73/804 |
| 2012/0187891 A1* | 7/2012 | Ueda | G05B 19/402 |
| | | | 318/615 |
| 2014/0060154 A1* | 3/2014 | Dijk | G01N 9/002 |
| | | | 73/24.05 |
| 2016/0123796 A1* | 5/2016 | Nagaoka | G01H 1/003 |
| | | | 702/56 |
| 2016/0179997 A1* | 6/2016 | Bremner | G06F 17/18 |
| | | | 703/2 |

FOREIGN PATENT DOCUMENTS

| | | |
|---|---|---|
| JP | 5-128091 A | 5/1993 |
| JP | 2003-61379 A | 2/2003 |
| JP | 2003-315145 A | 11/2003 |
| JP | 2004-101186 A | 4/2004 |
| JP | 2006-227793 A | 8/2006 |
| JP | 2011-80816 A | 4/2011 |

OTHER PUBLICATIONS

Chinese Office Action for corresponding CN201580048033.6, dated Apr. 26, 2019. English translation provided.

\* cited by examiner

VIBRATION MODE DETERMINING APPARATUS

FIELD

The present invention relates to a vibration mode determining apparatus that determines the vibration mode of machines that have motors.

BACKGROUND

Conventional known vibration mode determining apparatuses comprise a vibration measuring means having multiple sensor inputs, a means for calculating a transfer function, and a means for visualizing and outputting the vibration mode (for example, Patent Literature 1).

Further, conventional known apparatuses for analyzing the sensitivity of the control-parameters of an electric motor control unit comprise an electric motor attached to a machine; a detecting means for detecting the amount of motion of a subject constituted by the electric motor or the machine; a command unit that generates a command signal, and a control device that receives the command signal so as to drive the electric motor. The apparatus comprises an open-loop frequency response characteristic measuring means that measures an open-loop frequency response characteristic including no characteristic of the control device; a control device model of the control device of the electric motor control unit; a calculating means that calculates a one-round open-loop frequency response characteristic from the measured open-loop frequency response characteristic and the control device model; and a sensitivity analyzing device that analyzes the sensitivity of the relation between control-parameters of the control device and changes in the one-round open-loop frequency response characteristic (for example, Patent Literature 2).

CITATION LIST

Patent Literature

Patent Literature 1: Japanese Patent Application Laid-Open Publication No. H03-218421
Patent Literature 2: Japanese Patent Application Laid-Open Publication No. 2006-227793

SUMMARY

Technical Problem

The method disclosed in the above Patent Literature 1 needs an impulse hammer or a vibrator as a vibration exciter to be provided. If an impulse hammer is used, a user needs to perform a hitting action; and if a vibrator is used, in the case of a small-sized machine, a place to install the vibrator cannot be ensured; whereas, in the case of a large-sized machine, insufficient excitation force is exerted. That is, with the technique of Patent Literature 1, there are problems in that a burden is placed on the user and that there are restrictions due to machine size.

However, what Patent Literature 2 provides is not a vibration mode determining apparatus but an apparatus that can vibrate a machine with the use of a motor and calculate a transfer function from the excitation force picked up by a sensor attached to the machine structure. Thus it is thought that the problems of the burden on the user and restrictions due to machine size can be solved.

However, for the purpose of applying the technique of Patent Literature 2 to vibration mode determinations, a user needs to perform data processing for each of the conditions related to information on measurement points and the orientation of the sensor and needs to recalculate the transfer function or change it into phase data if the sensitivity direction of the sensor is opposite to the direction of an axis. That is, with the technique of Patent Literature 2, it is difficult to determine a highly reliable vibration mode with efficiency and high accuracy.

The present invention has been made in view of the above, and an objective thereof is to provide a vibration mode determining apparatus that determines the vibration mode of a machine having one or more motors with high reliability, efficiency, and high accuracy.

Solution to Problem

In order to solve the above problems and achieve the object, the present invention relates to a vibration mode determining apparatus that determines a vibration mode of a machine structure of a machine including one or more motors. The vibration mode determining apparatus includes a vibration command generating unit that generates a vibration command for the motor; a control unit that generates a current command for the motor according to the vibration command and outputs a conversion value for a motor excitation force; a motor drive unit that receives the motor current command from the control unit and drives the motor; a vibration sensor that detects vibration of the machine structure; a measurement-point information input unit that inputs information about one or more attachment points of the vibration sensor; and a vibration mode calculating unit that calculates the vibration mode using the conversion value for the motor excitation force and the output from the vibration sensor.

Advantageous Effects of Invention

According to the present invention, a machine having one or more motors can be provided with an apparatus that determines vibration modes of the machine with high reliability, efficiency, and high accuracy.

DESCRIPTION OF EMBODIMENTS

First Embodiment

Vibration mode determining apparatuses according to the embodiments of the present invention will be described in detail below with reference to the drawings. Note that embodiments below are not intended to limit the present invention.

Figure 1:
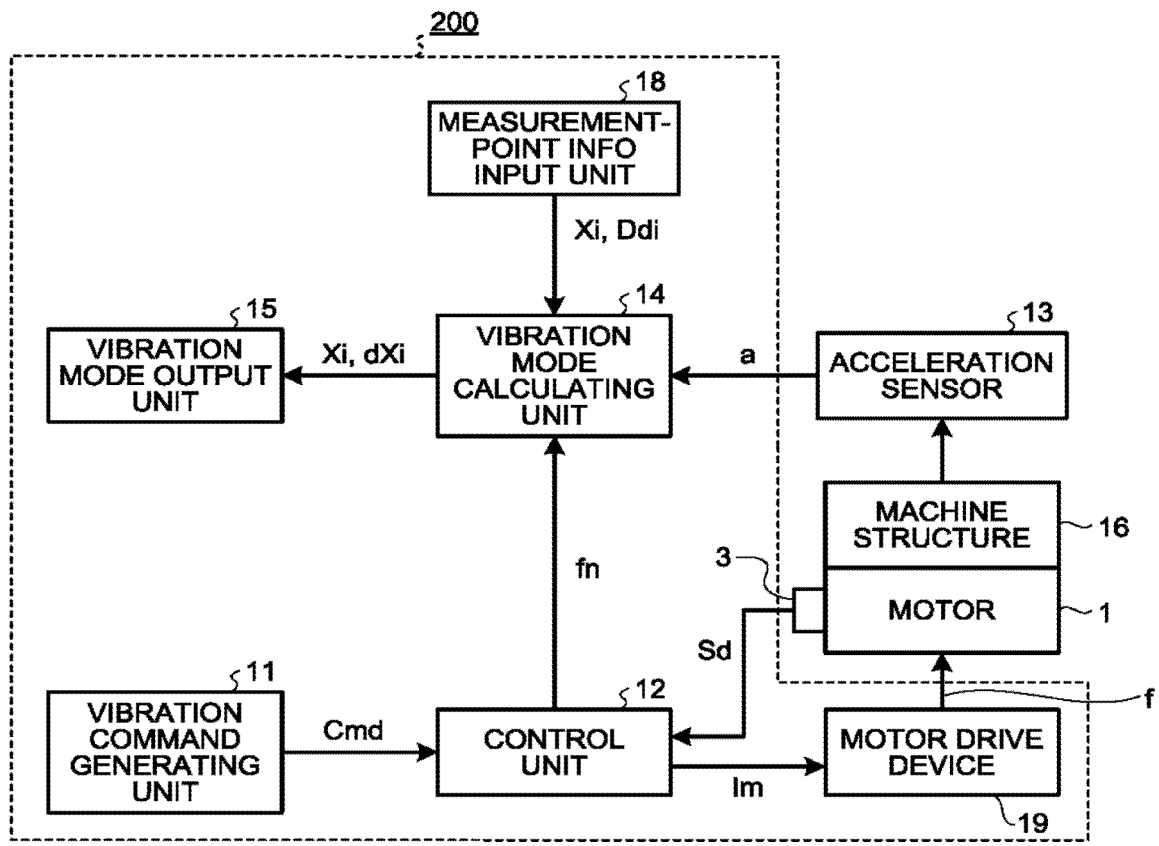
FIG. 1 is a block diagram illustrating schematically the configuration of a vibration mode determining apparatus according to the first embodiment.

FIG. 1 is a block diagram illustrating schematically the configuration of a vibration mode determining apparatus 200 according to the first embodiment of the present invention. The vibration mode determining apparatus 200 is an apparatus that determines the vibration mode of a machine structure 16 and is configured to include a motor drive device 19 that makes a motor 1 generate a drive force f so as to vibrate the machine structure 16; a vibration command generating unit 11 that generates a vibration command Cmd for the motor 1; a control unit 12 that controls the motor 1 using a current command Im generated according to the vibration command Cmd and a motor rotation angle Sd and that outputs an excitation force conversion value fn of the motor 1; a measurement-point information input unit 18 that sets the coordinate Xi of the ith measurement point and a sensor direction Ddi denoting the orientation of a sensor; and a vibration mode calculating unit 14 that calculates the vibration mode using acceleration a, which is the output of an acceleration sensor 13, which is an example of a vibration sensor attached to a measurement point of the machine structure 16 to detect vibration generated in the machine structure 16 by vibration excitation, the excitation force conversion value fn of the motor 1, and the coordinate Xi of the measurement point and the sensor direction Ddi. Note that a vibration mode output unit 15 can be provided that outputs the identified vibration mode in the form of an animation image as illustrated in the figure.

In the configuration of FIG. 1, examples of vibration commands generated by the vibration command generating unit 11 are a pseudo-random signal, a sign sweep signal, and the like. The pseudo-random signal and sign sweep signal are also regarded as velocity commands. Thus, in the first embodiment, a description will be made taking the "vibration command Cmd" as a "velocity command for vibration Cmd".

Figure 2:
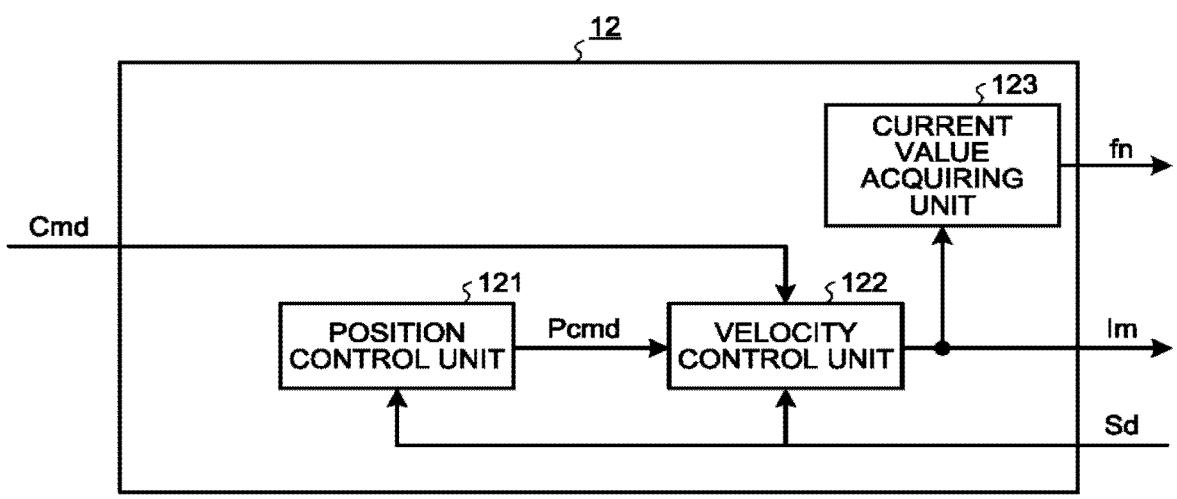
FIG. 2 is a block diagram illustrating details of a control unit.

FIG. 2 is a block diagram illustrating details of the control unit 12. The control unit 12 generates and outputs the current command Im to control the current flowing through the motor 1 (hereinafter called "motor current") so that the error between the velocity command for vibration Cmd and a detected position Sd that is the position into which the rotation angle of the motor 1 detected by an encoder 3 is converted becomes as small as possible. A current value acquiring unit 123 calculates and outputs the excitation force conversion value fn of the motor 1 from the current command Im. Although in FIG. 2 the current value acquiring unit 123 calculates the excitation force conversion value fn using the current command Im, it can calculate the excitation force conversion value fn using the feedback value of the motor current actually flowing through the motor 1. Here, the drive force f of the motor 1 is given by, for example, the following expression 1 using the torque constant Kt of the motor 1.

[Expression 1]

$$f = Kt * Im \tag{1}$$

A position control unit 121 is often constituted by a P controller. The vibration mode determining apparatus 200 decreases the gain of the position control unit 121 during vibration excitation. For setting the value, either method can be used from among setting the gain equal to the lower limit value of the frequency domain that is to be measured and setting the gain equal to a predetermined value that is one fifth to one tenth of the initially set gain for the position control unit 121. The reason for this is because the response band of the velocity control of a drive mechanism constituted by a feed screw is generally several hundred Hz, whereas the response band of the position control is only from several Hz to several tens of Hz; therefore, the position control cannot adequately excite vibration over a broad band. Accordingly, a velocity control having a broader band than the position control is used.

In general, the velocity control has a band three to eight times that of the position control. Current control performed in the motor drive device has a band five to ten times that of the velocity control. Where the velocity control is used, a vibration excitation signal can be input as the velocity command. However, where the position control is effectively operating, because the velocity command acts as a disturbance on the position control unit 121, a vibration excitation signal that is lower in the band than or equal to the position control band is suppressed. Accordingly, the gain of the position control unit 121 needs to be decreased so that the position control band becomes smaller than the lower limit of the frequency domain during vibration excitation. Moreover, if the gain of the position control unit 121 is set to 0 so that the position control is completely disabled, then the position of the machine is not controlled and thus the machine can move to an unintended position, and therefore the position control is not made completely disabled. A velocity control unit 122 is often constituted by a PI controller. The velocity control unit 122 performs velocity control using the velocity command for position control Pcmd, which is the output of the position control unit 121, the velocity command for vibration Cmd received from the vibration command generating unit 120, and the motor rotation angle Sd, which is the encoder output.

Figure 3:
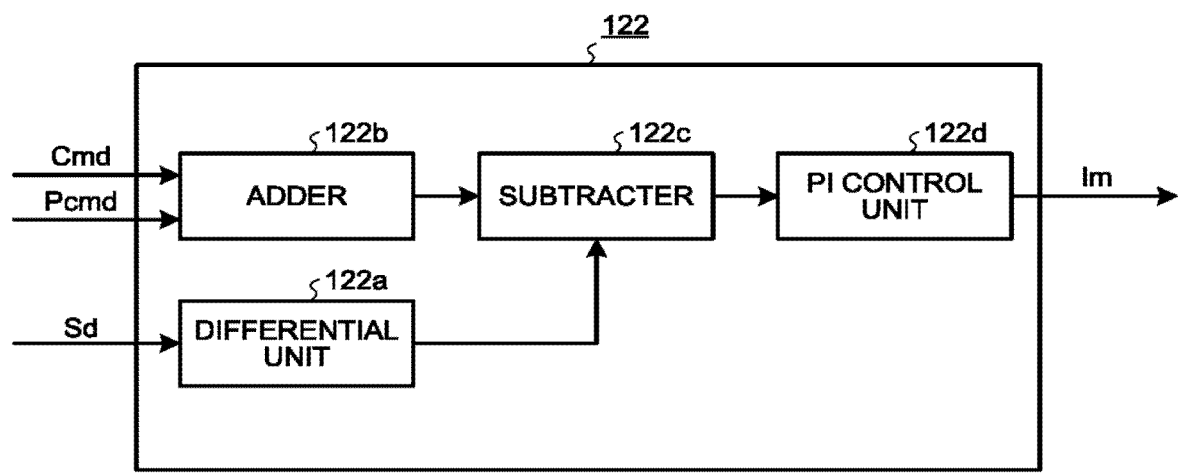
FIG. 3 is a block diagram illustrating details of a velocity control unit.

FIG. 3 is a block diagram illustrating details of the velocity control unit 122. A differential unit 122a differentiates the motor rotation angle Sd that is the encoder output to calculate the velocity of the motor 1. An adder 122b calculates the sum of the velocity command for vibration Cmd and the velocity command for position control Pcmd. A subtracter 122c outputs the difference in the output between the differential unit 122a and the adder 122b. A PI control unit 122d performs PI control on the output of the subtracter 122c in order to output the current command Im.

Figure 4:
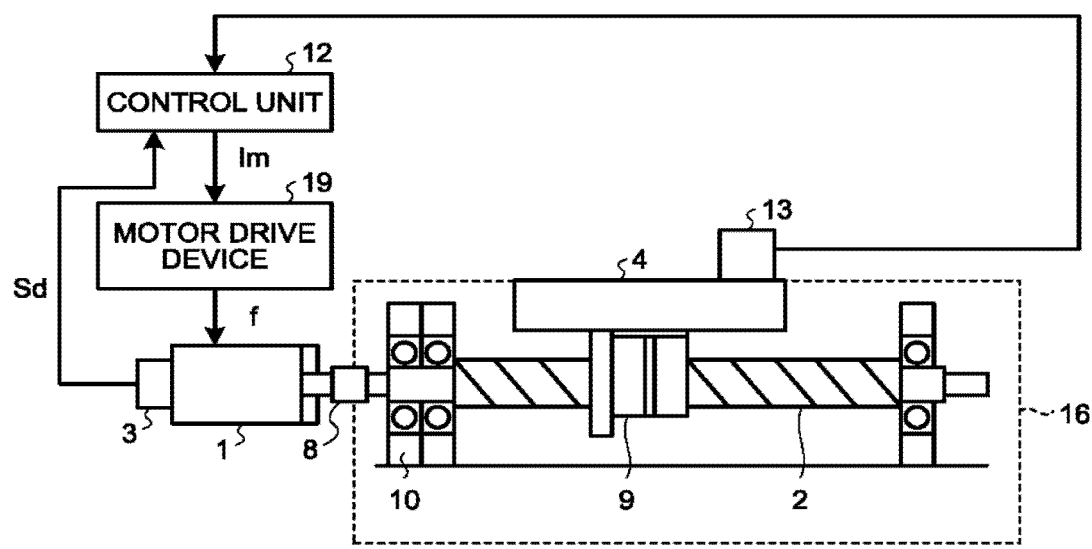
FIG. 4 is a schematic diagram illustrating schematically the configuration of the machine structure in FIG. 1.

FIG. 4 is a schematic diagram illustrating schematically the configuration of the machine structure 16 of FIG. 1. The motor drive device 19 generates the drive force f in the motor 1 according to the current command Im output from the control unit 12 so as to vibrate the machine structure 16. At this time, the rotational movement of the motor 1 is transmitted via a coupling 8 to a feed screw 2 and converted into translatory movement via a nut 9. The translatory movement of the feed screw 2 is restricted by a support bearing 10. The translatory movement of the nut 9 causes a work table 4 to move in a straight line. At this time, the acceleration sensor 13 installed on the work table 4 measures acceleration a and outputs it to the vibration mode calculating unit 14 in the vibration mode determining apparatus 200. Moreover, the motor 1 rotates according to the current command Im input from the motor drive device 19 of the vibration mode determining apparatus 200; and the rotation velocity and rotation angle of the motor 1 measured by the encoder 3 are output to the control unit 12 via the motor drive device 19.

A user enters the coordinate Xi of the ith measurement point, to which the acceleration sensor 13 is attached, and the sensor direction Ddi, which denotes the orientation of the sensor at that time, into the measurement-point information input unit 18. The coordinate Xi of the measurement point is used as the coordinate at which the sensor attached position is displayed when an animation image is displayed. Also, if the acceleration sensor 13 cannot be attached such that the orientations of constituting x, y, and z axes of the machine coincide with those of the coordinate axes of the sensor, the sensor direction Ddi is entered such that it record their correspondence relation. For example, if the 1ch, 2ch, and 3ch of a three-axis acceleration sensor are attached facing in the y axis positive direction, x axis positive direction, and z axis negative direction respectively of a machine constituted thereby, the sensor direction Ddi is given as (+y, +x, −z).

Figure 5:
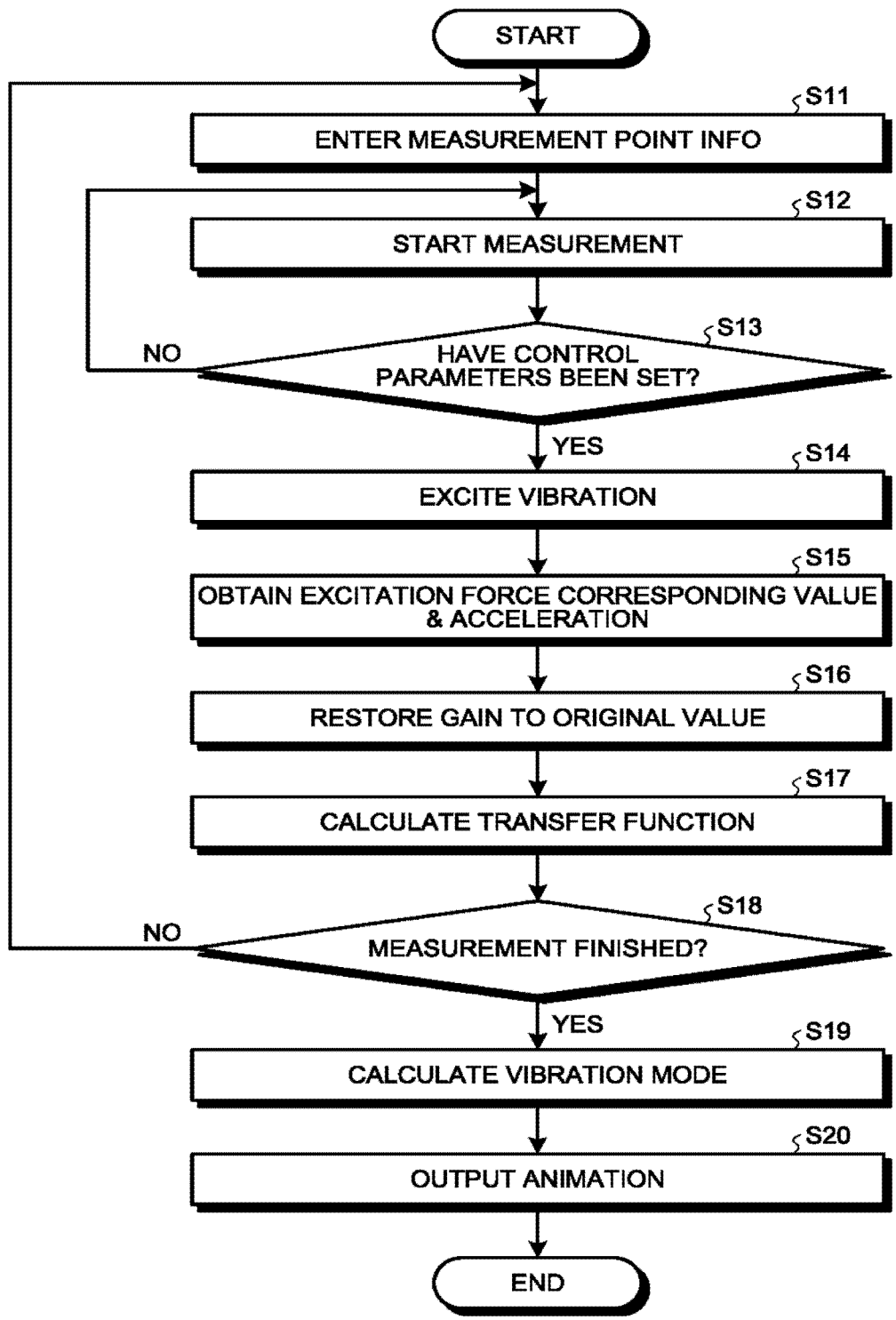
FIG. 5 is a flow chart illustrating the process of calculating the transfer function and identifying the vibration mode by a measurement system of the first embodiment illustrated in FIGS. 1 to 4.

The vibration mode calculating unit 14 calculates the transfer function and identifies the vibration mode using the excitation force conversion value fn and acceleration a. FIG. 5 is a flow chart illustrating the process of calculating the transfer function and identifying the vibration mode performed by the measurement system in the first embodiment illustrated in FIGS. 1 to 4.

First, a user attaches the acceleration sensor 13 to a measurement point on the machine structure 16. At step S11, the user enters the coordinate Xi of the measurement point and the sensor direction Ddi as measurement-point information into the measurement-point information input unit 18. At step S12, the user determines which information fn is input from the control unit 12 denoting an excitation force; the velocity command for vibration Cmd to realize the vibration mode that the motor 1 is made to rotate pseudorandomly; and information Im denoting the motor current so as to start measuring the vibration of the machine structure 16. When the measurement starts, the vibration command generating unit 11 outputs a command for the setting control-parameters of the control unit 12. Note that the command for setting control-parameters is also one of the vibration commands Cmd illustrated in FIG. 1. When the command for setting control-parameters is output to the control unit 12, the gain of the position control unit 121 is changed.

At step S13, it is determined whether control-parameters such as the excitation force conversion value fn and the current command Im have been set; and if the control-parameters have been set (Yes at step S13), the process proceeds to step S14; and if it has not been set (No at step S13), steps S12, S13 are repeated.

At step S14, the vibration command generating unit 11 outputs the velocity command for vibration Cmd to the control unit 12, and the control unit 12 controls the motor drive device 19 such that it rotationally drives the motor 1 so as to start vibrating the machine structure 16. At step S15, during vibration, the vibration mode calculating unit 14 measures synchronously the excitation force conversion value fn and acceleration a. Note that the value of the motor current monitored during vibration can be used instead of the excitation force conversion value fn. At step S16, when the vibration finishes, the vibration command generating unit 11 again outputs a command for setting control-parameters to restore the gain, which was changed at step S12, to the original value.

At step S17, after the vibration finishes, the vibration mode calculating unit 14 calculates the transfer function from the measured motor current monitored value fn and acceleration a. At step S18, it is determined whether the measurement has finished, and if the measurement has finished (Yes at step S18), the process proceeds to step S19; and if it has not finished (No at step S18), the process returns to step S11. Note that at step S18, it can be determined whether the user has selected measurement or not; and if it is determined that measurement has been selected, the process proceeds to step S19, where the vibration mode is calculated.

At step S19, the vibration mode calculating unit 14 calculates the vibration mode. At step S20, the vibration mode output unit 15 animates the vibration mode and it is displayed.

Figure 6:
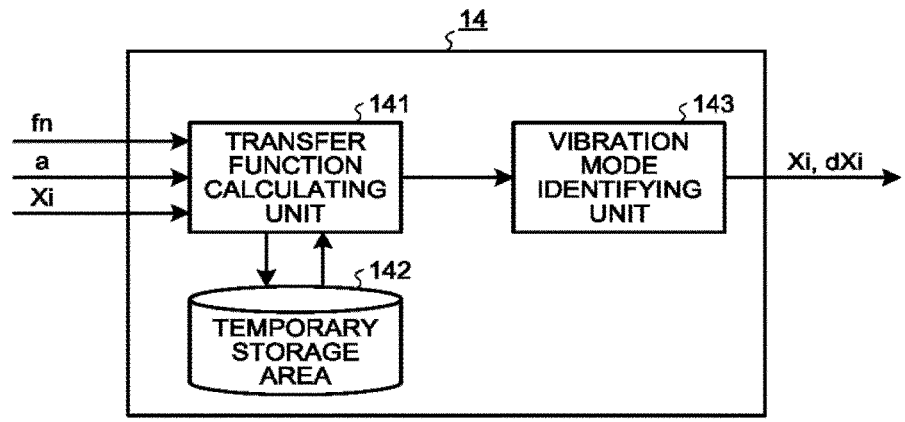
FIG. 6 is a block diagram illustrating details of a vibration mode calculating unit.

FIG. 6 is a block diagram illustrating the details of the vibration mode calculating unit 14. The vibration mode calculating unit 14 comprises a transfer function calculating unit 141, a temporary storage area 142, and a vibration mode identifying unit 143. The excitation force fn, acceleration a, and the coordinate Xi of the measurement point are input to the vibration mode calculating unit 14.

The excitation force fn and acceleration a are synchronously sampled by the transfer function calculating unit 141, and after the vibration finishes, the transfer function is calculated. As a method of calculating a transfer function from a time-series waveform, many methods have been proposed. There are, for example, a spectrum analytical method, an ARX identification, a subspace method, and the like. In the present embodiment of the vibration mode determining apparatus, the method described in detail of calculating the transfer function uses an H1 estimation method, which is a spectrum analytical with the excitation force as input and the acceleration as output. The algorithm for calculating the transfer function is obviously not limited to the description below.

Where the acceleration sensor 13 is a three-axis type, because a three-direction acceleration response a is obtained as a three-component vector, the order of input channels of the sensor for x, y, and z directions of the machine is changed to be in accordance with the sensor direction Ddi. If F(s) and A(s) are Fourier spectrums of the excitation force f and acceleration a respectively, then an input power spectrum Gff is expressed by the expression 2 and an input/output cross spectrum Gaf is expressed by the expression 3. Here, * indicates a conjugate spectrum. The transfer function Gi(s) at the ith measurement point is expressed by the expression 4 if the H1 estimation method is used. When the H1 estimation method is used, noise present in the signal of acceleration a, which is an output signal, can be minimized by averaging.

[Expression 2]

$$Gff=F(s)\times F^*(s) \quad (2)$$

[Expression 3]

$$Gaf=F(s)\times A^*(s) \quad (3)$$

[Expression 4]

$$Gi(s)=Gaf/Gff \quad (4)$$

Information about the calculated transfer function is associated with the coordinate Xi of the measurement point input from the measurement-point information input unit 18 and is stored in the temporary storage area 142 until the measurement of the transfer function finishes at all the measurement points. When the measurement finishes at all the measurement points, the transfer function calculating unit 141 outputs information about all the transfer functions to the vibration mode identifying unit 143.

The vibration mode identifying unit 143 identifies mode parameters (a natural frequency, a mode attenuation ratio) that define the vibration mode by a method such as curve-fitting. As the identifying method, there are various methods such as mode circle fitting and partial difference iteration. Here, a vibration mode is derived in the form of amplitude and phase data of the time-series response to the excitation force at each point, which is convenient to use for evaluating vibration from the aspect of control. In order to calculate the frequency characteristic of the transfer function Gi(s), jω is substituted. Here, j is the imaginary unit, and ω is a frequency (Expression 5). In this case, at a frequency ω, the amplitude ratio R(ω) and phase difference d(ω) for the excitation force f are expressed by the expression 6, where "abs" denotes an absolute value function.

[Expression 5]

$$Gi(j\omega)=Gaf(j\omega)/Gff(j\omega) \quad (5)$$

[Expression 6]

$$R(\omega)=\text{abs}(Gi(j\omega))$$

$$d(\omega)=\tan^{-1}(Gi(j\omega)) \quad (6)$$

In this case, the displacement (amount of displacement) dXi from the reference coordinate Xi of each measurement point i in response to the input of the excitation force f at the frequency ω can be expressed by a sinusoidal function as in the following expression 7, if it is assumed to be a linear system.

[Expression 7]

$$dXi(\omega) = -\frac{R(\omega)}{\omega^2}\sin(\omega t + d(\omega)) \quad (7)$$

In the above expression, t is time, and if the acceleration sensor 13 is a three-axis type, the displacement dXi includes components of three directions, x, y, and z. After the displacement dXi is calculated for all the measurement points i, the shape of the vibration mode at a frequency ω for the excitation force f can be described in the time domain. The vibration mode calculating unit 14 outputs the reference coordinate Xi and the displacement dXi as information representing the calculated vibration mode at each measurement point i to the vibration mode output unit 15.

The vibration mode output unit 15 creates an animation image from the measurement point coordinate Xi and the displacement dXi and this is displayed. First, for all the measurement points i, a wire-frame model of the machine is drawn as reference points in accordance with the measurement point coordinates Xi. Then, the displacement dXi from the reference point Xi, Δt sec later, is calculated for a target frequency ω. The value of the displacement dXi is calculated every Δt sec, and the coordinates of the measurement points are updated. Thus, an animation image of the vibration mode is displayed.

As described above, the vibration mode determining apparatus according to the present embodiment vibrates a machine using a motor of a drive axis and calculates the vibration mode using the excitation force conversion value and information about one or more attachment points of vibration sensors installed at a plurality of points on the machine structure. Thus it is possible to measure the frequency responses from the vibration sensors installed at the plurality of points, so that it is possible to perform a series of operations of the calculation of the vibration mode from the frequency response to the excitation force at each point up to the outputting. Further, because control-parameter settings are changed during vibration excitation, it is possible to vibrate the machine structure over a broad band.

Second Embodiment

Figure 7:
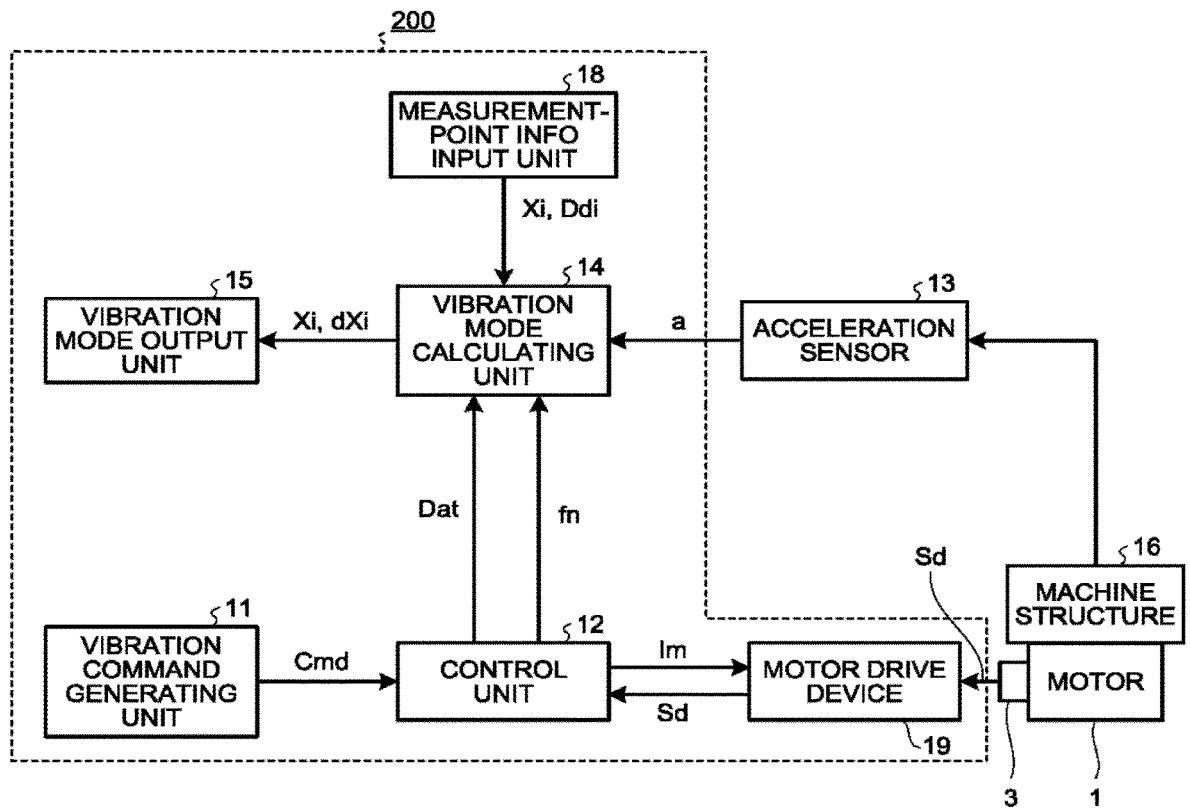
FIG. 7 is a block diagram illustrating an outline of a vibration mode determining apparatus of the second embodiment.

FIG. 7 is a block diagram illustrating an outline of a vibration mode determining apparatus in the second embodiment. It is different to the first embodiment in that machine information Dat is output from the control unit 12 to the vibration mode calculating unit 14.

Figure 8:
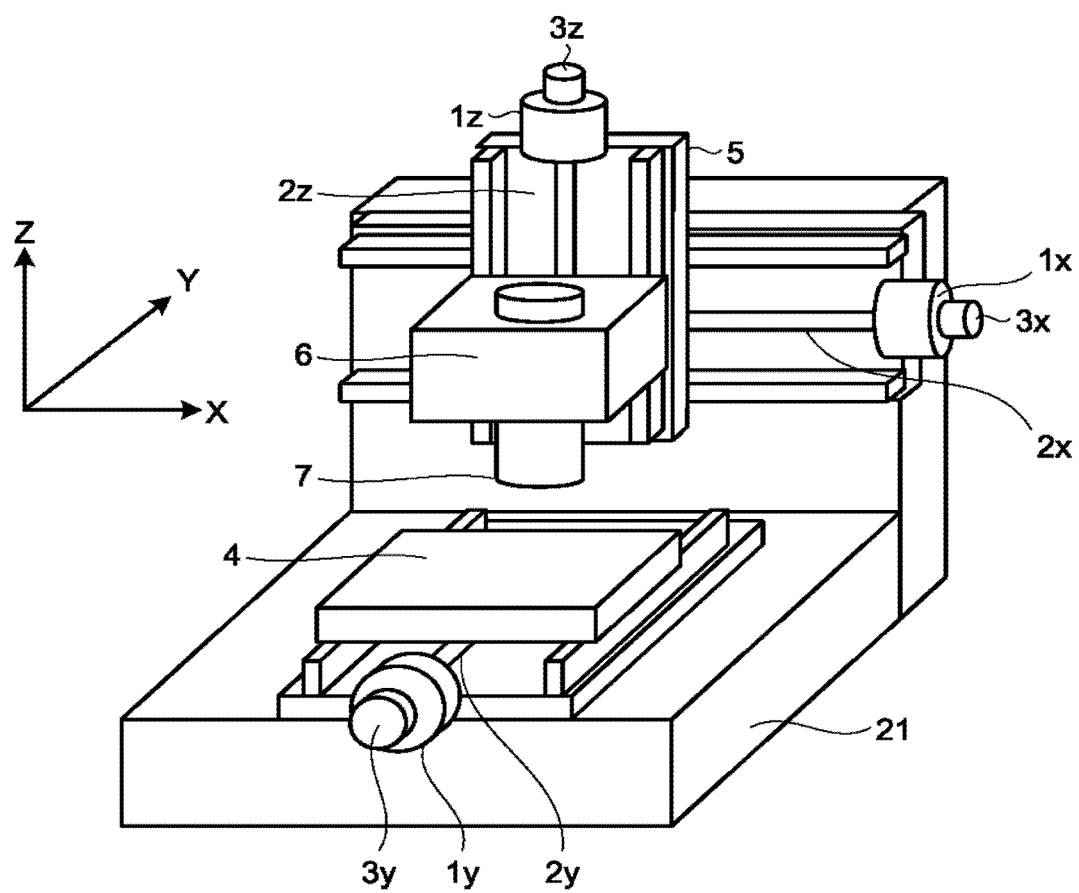
FIG. 8 is a perspective view illustrating schematically the configuration of a three-axis machine tool for which the vibration mode determining apparatus is used in the second embodiment.

FIG. 8 is a perspective view illustrating schematically the configuration of a three-axis machine tool for which the vibration mode determining apparatus is used in the second embodiment. In FIG. 8, the machine tool has multiple movable axes of which movement is guided in X-axis, Y-axis, and Z-axis directions; and the movable axes are driven by drive mechanisms comprising motors 1x, 1y, 1z and feed screws 2x, 2y, 2z, respectively. The rotation angles of the motors 1x, 1y, 1z are detected by encoders 3x, 3y, 3z, respectively, and are fed back to a motor control unit. The configuration of the drive mechanism for each axis is the same as that in the configuration of the vibration mode determining apparatus schematically illustrated in FIG. 1. But in terms of the motor driving method, instead of the motors 1x, 1y, 1z and feed screws 2x, 2y, 2z, linear motors can be used; and instead of the encoders 3x, 3y, 3z, linear scales can be used.

In this machine tool, the work table 4 is driven by the Y-axis drive mechanism; and a column 5 is driven by the X-axis drive mechanism. A main spindle head 7 is driven via a ram 6 by the Z-axis drive mechanism attached to the column 5 and, as a result, a three-dimensional shape is created between the tool attached to the end of the main spindle head 7 and a workpiece mounted on the work table 4. The work table 4 and the column 5 are installed over a base 21. In the second embodiment, because there are three drive axes, the vibration command generating unit 11 outputs designation of the axis along which there are to be vibrations and a velocity command for vibration Cmdx to Cmdz for the corresponding axis.

Figure 9:
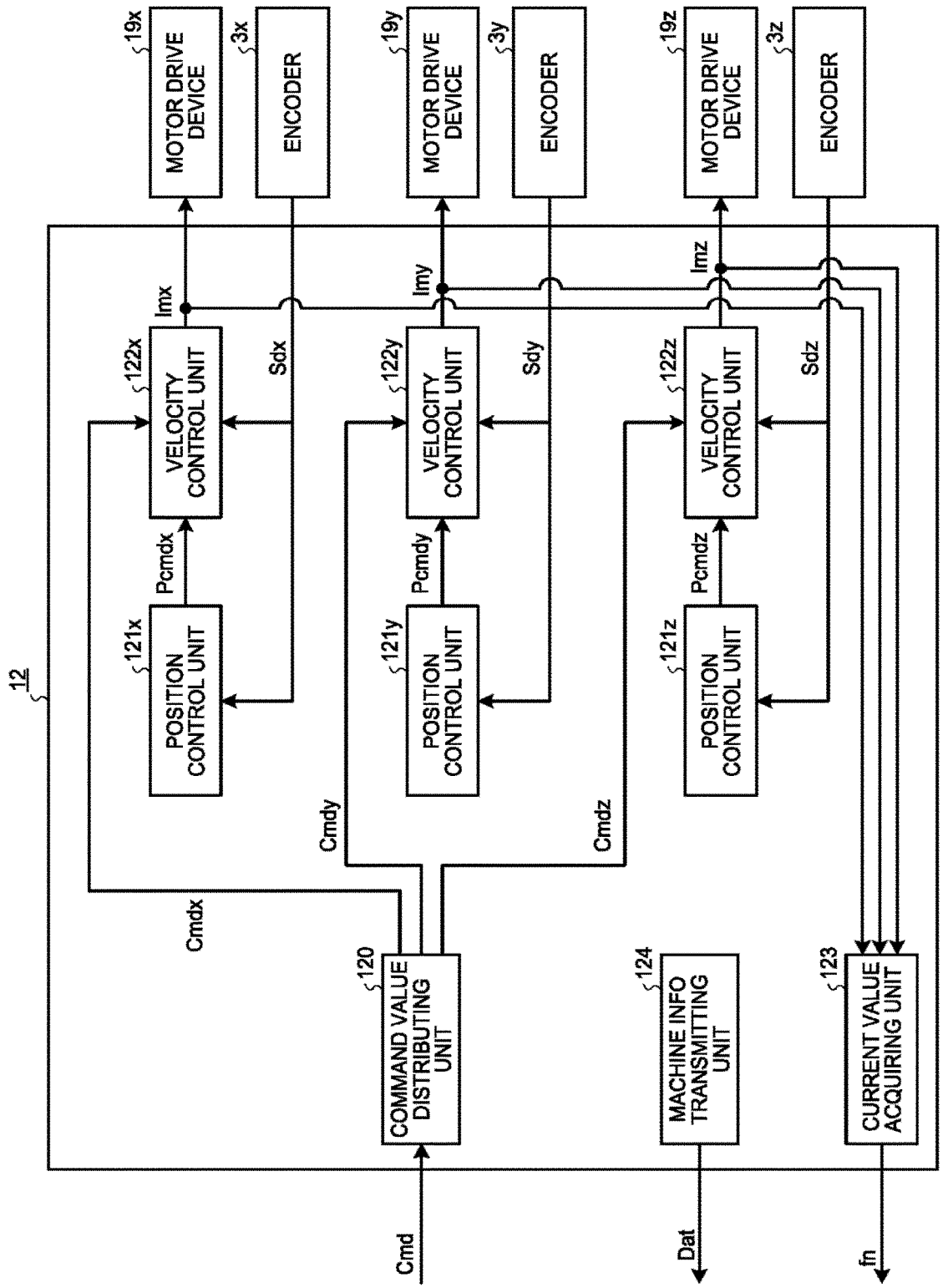
FIG. 9 is a block diagram illustrating an outline of the configuration of the control unit of the second embodiment.

FIG. 9 is a block diagram illustrating an outline of the configuration of the control unit 12 in the second embodiment. In the control unit 12 in the second embodiment, position control units 121$x$, 121$y$, 121$z$ and velocity control units 122$x$, 122$y$, 122$z$ are provided for the X axis, Y axis, and Z axis respectively as illustrated in FIG. 9. The work table positions Sdx, SDy, Sdz, which are the outputs of the encoders 3$x$, 3$y$, 3$z$, are input to the position control units 121$x$, 121$y$, 121$z$. Velocity commands for position control Pcmdx, Pcmdy, Pcmdz, which are the outputs of the position control units 121$x$, 121$y$, 121$z$, velocity commands for vibration Cmdx, Cmdy, Cmdz for the respective axes, which are distributed by a command value distributing unit 120 and the work table position Sdx, SDy, Sdz are input to the velocity control units 122$x$, 122$y$, 122$z$, respectively. The velocity control unit 122$x$ outputs an X-axis current command Imx generated using the velocity command for position control Pcmdx, velocity command for vibration Cmdx, and work table position Sdx to a motor drive device 19$x$ that functions along an X-axis. Likewise for the Y axis and Z axis, the velocity control unit 122$y$ outputs a Y-axis current command Imy generated using the velocity command for position control Pcmdy, velocity command for vibration Cmdy, and work table position Sdy to a motor drive device 19$y$ that functions along the Y-axis; and the velocity control unit 122$z$ outputs a Z-axis current command Imz generated using the velocity command for position control Pcmdz, velocity command for vibration Cmdz, and work table position Sdz to a motor drive device 19$z$ that functions along the Z-axis. Further, the control unit 12 has a machine information transmitting unit 124 that acquires the state quantity of the machine to output to the vibration mode calculating unit 14.

Figure 10:
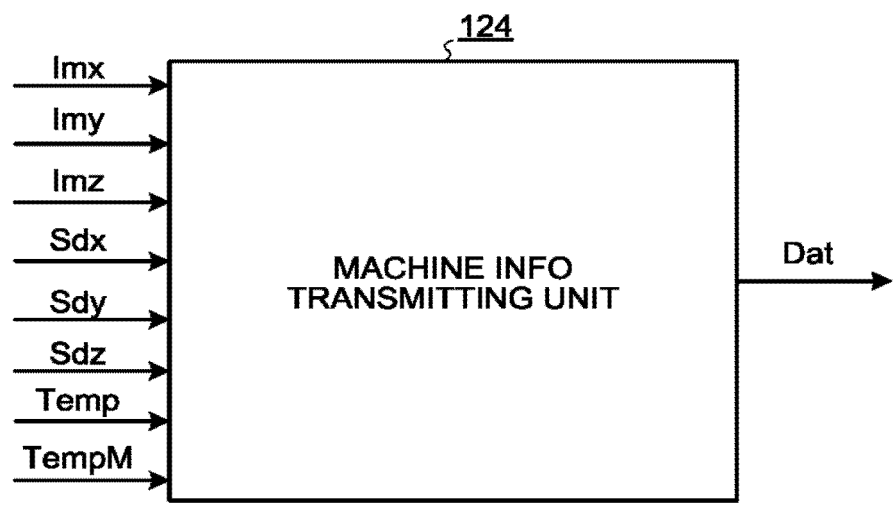
FIG. 10 is a block diagram illustrating details of a machine information transmitting unit.

FIG. 10 is a block diagram illustrating details of the machine information transmitting unit 124. The machine information transmitting unit 124 collects the work table position Sdx, SDy, Sdz of the machine, the current commands Imx to Imz, air-temperature information Temp measured by a temperature sensor (not illustrated), and a temperature TempM of the machine measured by a temperature sensor (not illustrated) and outputs machine information Dat to the vibration mode calculating unit 14. This is because it is known that the vibration mode changes in a multi-axis machine tool depending on the position of the work table, motor load, the temperature of the machine, air temperature, and the like. Therefore, this state information on the machine and the vibration mode need to be managed in association with each other. Instead of the current commands Imx to Imz, the feedback value of the motor current actually flowing through the motor 1 (especially current while at rest) can be the machine information Dat.

When calculating the transfer function to store in the temporary storage area 142, the vibration mode calculating unit 14 stores it in association with information about the axis used for vibration and the machine information Dat. Thus, the user can easily obtain the relation between the machine information Dat and the vibration mode. Further, the user can easily obtain the difference in excited vibration mode between the axes along which there are vibrations. Furthermore, because information such as the axis along which there are vibrations and the machine position and the vibration mode are stored in association with each other, there is the effect that it is easier to understand the vibration characteristics of the machine structure.

Third Embodiment

Figure 11:
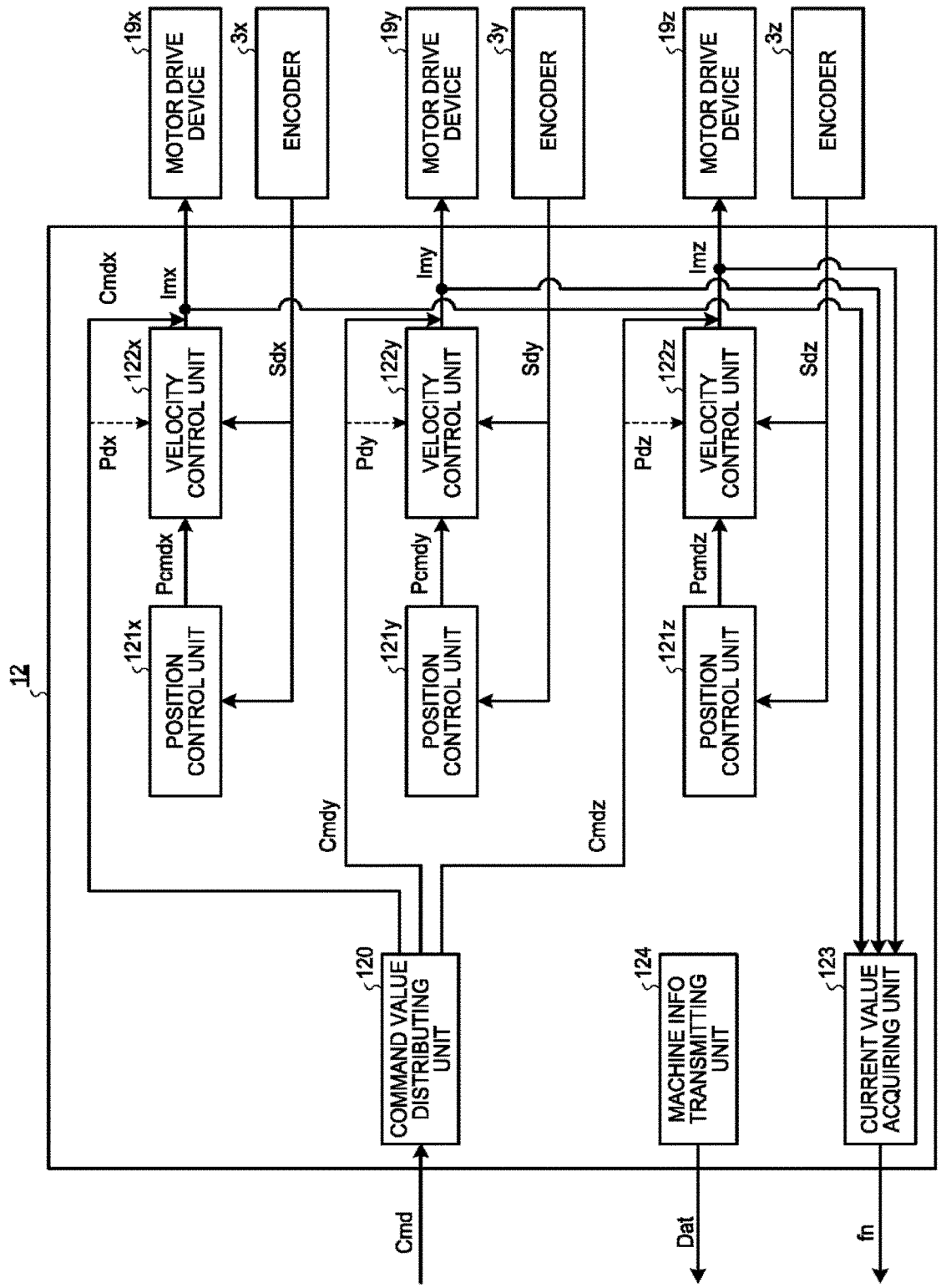
FIG. 11 is a block diagram illustrating an outline of the control unit of a vibration mode determining apparatus of the third embodiment.

FIG. 11 is a block diagram illustrating an outline of the control unit 12 of a vibration mode determining apparatus in the third embodiment. It is different from the second embodiment in that the vibration commands Cmdx, Cmdy, Cmdz are issued not as velocity commands but as current commands to the motor drive devices 19$x$, 19$y$, 19$z$ that are drive mechanisms respectively. The vibration commands are input as current commands, so that the machine can be vibrated by the motor 1 up to a higher frequency domain than in the case where they are input as velocity commands.

Meanwhile, because the vibration commands Cmdx, Cmdy, Cmdz of frequencies not higher than the velocity control band are suppressed, the gain of the velocity control unit 122 is changed so that the velocity control band coincides with the lower limit of the frequency domain in which measurement are made. Accordingly, the vibration commands Cmdx, Cmdy, Cmdz are used as information Pdx, Pdy, Pdz to change the gain of the velocity control unit 122 with. Further, if the position control band is broader than the velocity control band, the control system becomes unstable. Therefore, the gain of the position control unit 121 also needs to be changed so that the position control band becomes narrower than the velocity control band. In this case, for setting the gain value, either one of the methods can be used from among setting the gains of the position control unit 121 and the velocity control unit 122 equal to the lower limit of the frequency domain in which measurements are to be made and setting the gains equal to predetermined values that are one fifth to one tenth of the initial gain settings.

Fourth Embodiment

Figure 12:
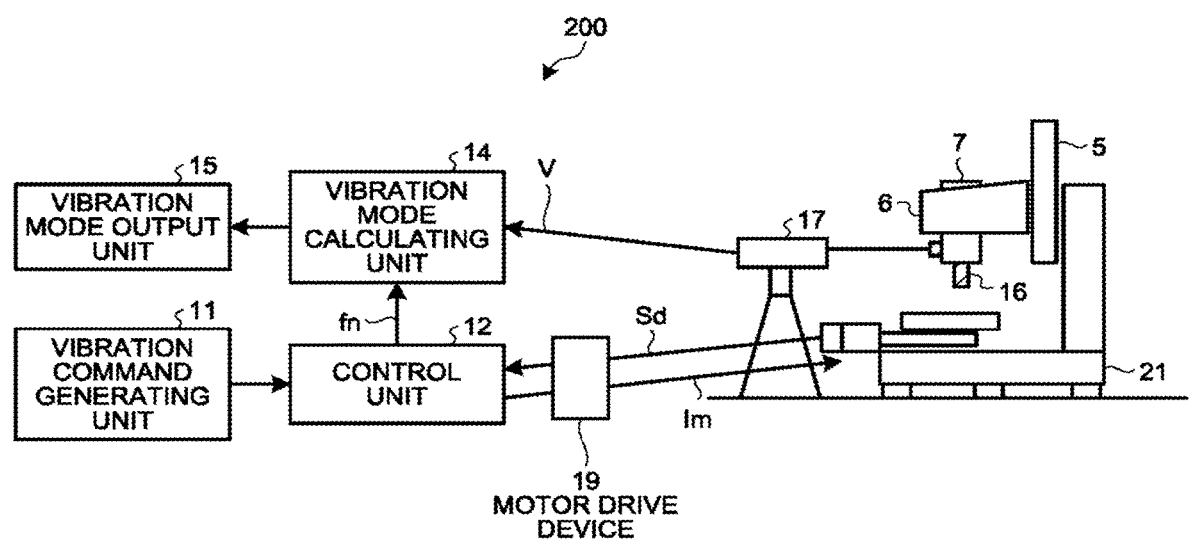
FIG. 12 is a block diagram illustrating an outline of a vibration mode determining apparatus in the fourth embodiment.

In the vibration mode determining apparatus according to the present invention, a sensor other than the acceleration sensor can be used as the sensor for detecting vibration. FIG. 12 is a block diagram illustrating an outline of a vibration mode determining apparatus in the fourth embodiment. It is different to Embodiments 1 to 3 in that a laser Doppler vibration meter 17 to measure the relative velocity V between the installation point and an object being measured is used for detecting the acceleration of the machine structure.

Because the acceleration sensor 13 detects absolute acceleration, if, for example, the rigidity of the floor on which a machine is installed is so low that driving the machine causes the floor to vibrate, then the floor vibration is detected as a vibration mode. Accordingly, if it is necessary to remove the influence of the floor vibration, the operation of removing a part corresponding to the floor vibration from the measured transfer function needs to be performed. In contrast, when the laser Doppler vibration meter 17 is used, the relative velocity V between the installation floor and the measurement point is detected; so the operation of removing the floor vibration need not be performed.

Where the laser Doppler vibration meter 17 is used to detect vibration, the transfer function calculated by the transfer function calculating unit 141 is a transfer function from the excitation force to the velocity; and in calculating the vibration mode, the vibration mode identifying unit 143 can identify the vibration mode from the expression expressed by Expression 8.

[Expression 8]

$$dXi(\omega) = \frac{R(\omega)}{\omega}\cos(\omega t + d(\omega)) \quad (8)$$

Fifth Embodiment

The fifth embodiment has a configuration where, instead of the laser Doppler vibration meter 17 illustrated in FIG. 12, a laser displacement gage or laser interferometer to directly measure a displacement is used. If a laser displacement gage or laser interferometer is used, the displacement of the machine structure in response to the excitation force can be directly measured. When a laser displacement gage or laser interferometer is used, the vibration mode is given by, for example, the expression 9. Because displacements are directly measured, there is the effect that errors of the position and locus of the object can be directly evaluated.

[Expression 9]

$$dXi(\omega) = R(\omega)\sin(\omega t + d(\omega)) \quad (9)$$

Sixth Embodiment

Figure 13:
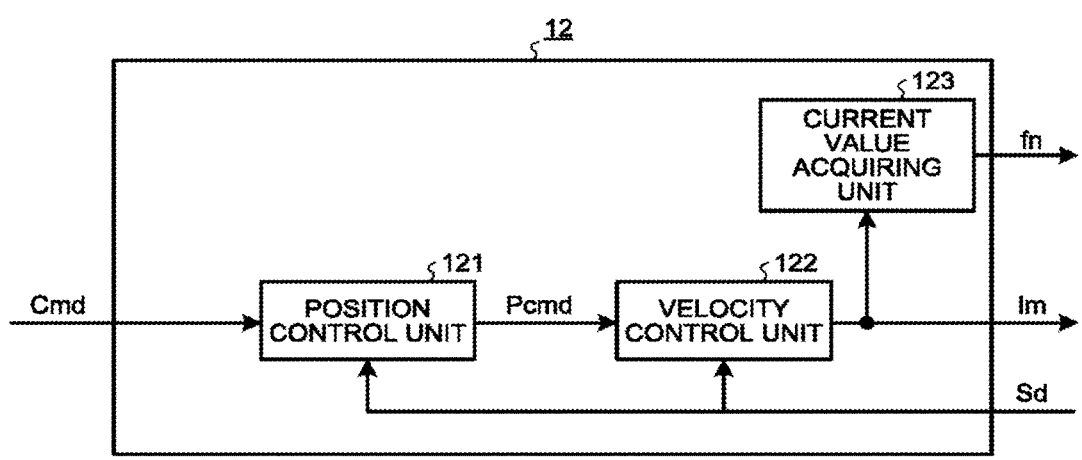
FIG. 13 is a block diagram illustrating an outline of the control unit of a vibration mode determining apparatus of the sixth embodiment.

FIG. 13 is a block diagram illustrating an outline of the control unit 12 of a vibration mode determining apparatus in the sixth embodiment. A fine movement mechanism to finely adjust the position of the work table 4 can be incorporated in drive mechanisms of machine tools. As actuators used in general fine movement mechanisms, there are, for example, piezoelectric actuators and voice coil motors.

Such actuators used for fine movement have characteristics of high accuracy and response. Thus, a responsivity of several hundred Hz in the position control band can be realized without issuing the velocity command or current command as the vibration command. Hence, the vibration command can be issued directly as the position command to the control unit 12. Thus there is the effect that control-parameters need not be used during vibration excitation.

Seventh Embodiment

Figure 14:
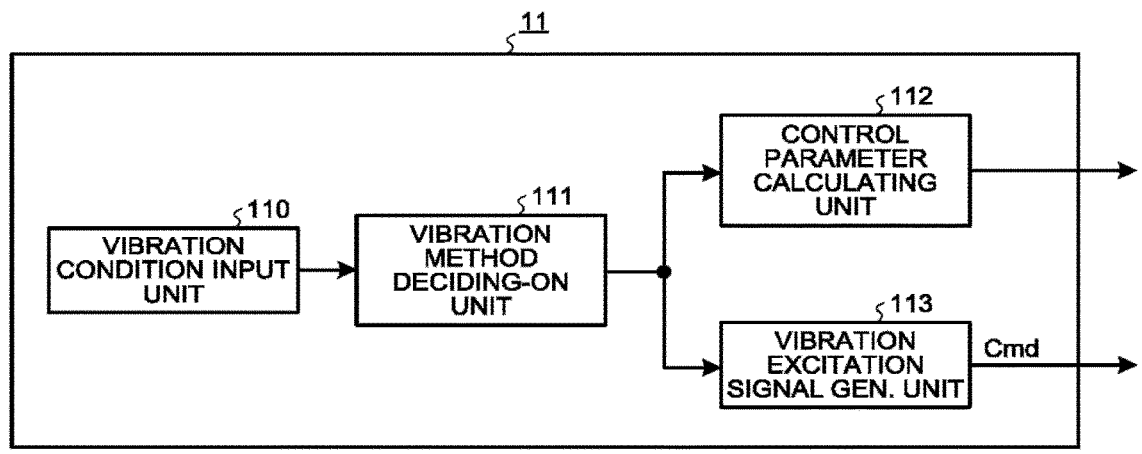
FIG. 14 is a block diagram illustrating the configuration of a vibration command generating unit of the seventh embodiment.

FIG. 14 is a block diagram illustrating the configuration of the vibration command generating unit 11 in the seventh embodiment. In the seventh embodiment, a user enters the axis along which there are to be vibrations, the upper and lower limits of the frequency band in which measurement are to be made, and the type of the vibration excitation signal into a vibration condition input unit 110. The vibration method deciding-on unit 111 decides whether to input the vibration command for the position command, the velocity command, or the current command depending on the upper limit of the frequency band entered. At this time, if the upper limit of the frequency band in which measurements are to be made is below the position control band, the position command is selected; if it is above or at the position control band and below the velocity control band, the velocity command is selected; and if it is above or at the velocity control band, the current command is selected.

A vibration excitation signal generating unit 113 generates the vibration command Cmd depending on the type of the vibration command and the type of vibration. For example, if the type of vibration command is a velocity command and the type of vibration excitation signal is a pseudo-random signal, then a pseudo-random command that is the velocity command is output as the vibration command Cmd. If the type of the vibration command is a current command and the type of vibration excitation signal is a sign sweep signal, then a sign sweep command that is the current command is output as the vibration command Cmd. The control-parameter calculating unit 112 decides the gains of control-parameters in accordance with the type of the vibration command and the lower limit of the frequency band in which measurements are to be made.

Eighth Embodiment

Those skilled in the art will understand it to be obvious that a vibration mode determining apparatus 200 according to the present invention can be realized in software to be executed on a computer having the acceleration sensor 13, the motor drive device 19, and the like, and that the vibration mode determining apparatus 200 can specifically be implemented using the hardware resources of a computer. Further, those skilled in the art will understand it to be obvious that the vibration mode determining apparatus 200 is supplied in the form of software stored on a storage medium or via a network to the computer; is loaded into a RAM or the like; and can be implemented using the hardware resources specifically.

Figure 15:
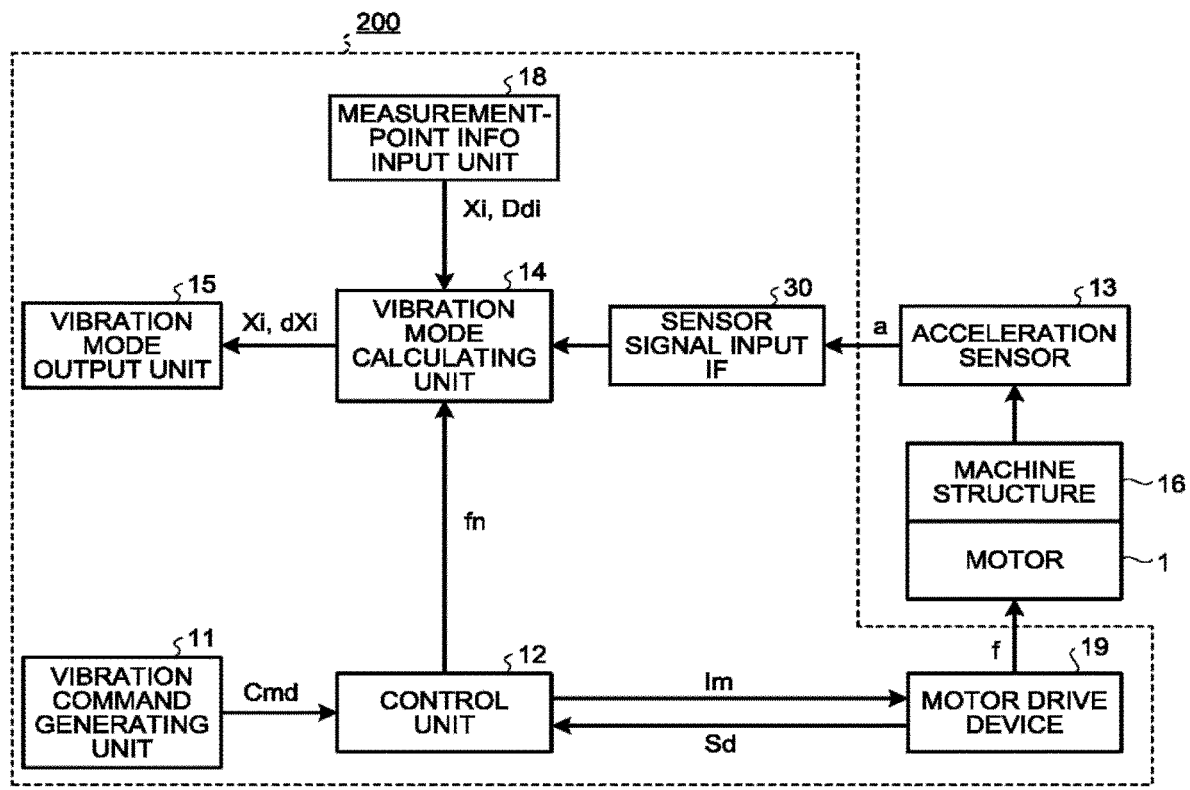
FIG. 15 is a block diagram illustrating schematically the configuration of a vibration mode determining apparatus according to the eighth embodiment.

FIG. 15 is a block diagram illustrating schematically the configuration of a vibration mode determining apparatus 200 according to the eighth embodiment. It is different from the first embodiment in that the constituents of the vibration mode determining apparatus 200 do not include an acceleration sensor and in that it has a sensor signal input interface (hereinafter referred to as a sensor signal input IF) 30, to which a sensor signal is input.

The eighth embodiment includes the sensor signal input IF 30 to take in a signal from the acceleration sensor 13, which is an example of a vibration sensor installed outside. A sensor signal input IF 30 is implemented as, e.g., a signal taking-in AD converter. The sensor signal input IF 30 takes in a signal from the sensor 13 and converts it into a digital signal to output to the vibration mode calculating unit 14. The vibration sensor 13 can be various sensors depending on the measurement method, size, and price. Accordingly, the vibration mode determining apparatus 200 has the sensor signal input IF 30, which is a common signal input interface, so that any vibration sensor can be used to make measurements.

Ninth Embodiment

Figure 16:
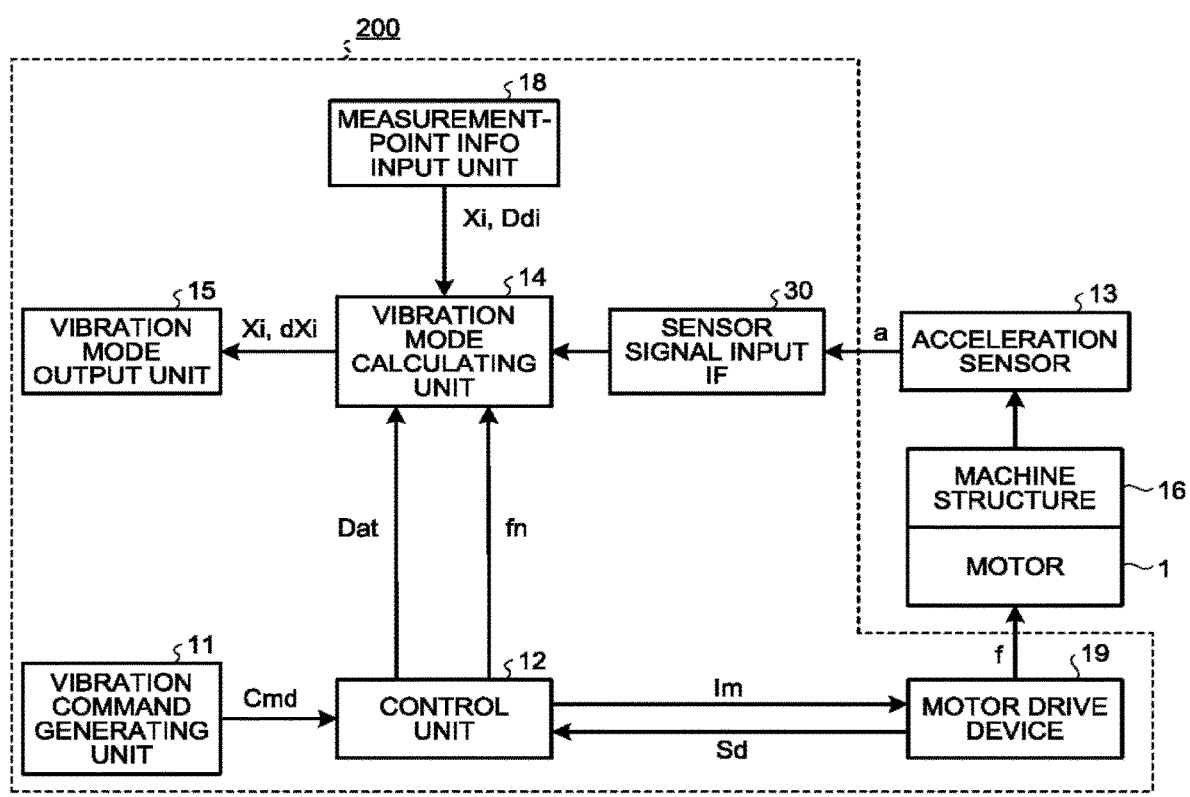
FIG. 16 is a block diagram illustrating schematically the configuration of a vibration mode determining apparatus according to the ninth embodiment.

FIG. 16 is a block diagram illustrating schematically the configuration of a vibration mode determining apparatus 200 according to the ninth embodiment. It is different to the eighth embodiment that the control unit 12 outputs the machine information Dat to the vibration mode calculating unit. Also in the ninth embodiment, the sensor signal input IF 30 takes in a signal from the sensor 13 and converts it into a digital signal so as to output it to the vibration mode calculating unit 14 as illustrated in the eighth embodiment.

When calculating the transfer function to store in the temporary storage area 142, the vibration mode calculating unit 14 stores it in association with information about the axis used for vibration and the machine information Dat. Thus, the experimenter can easily obtain the relation between the machine information Dat and the vibration mode. Further, the experimenter can easily obtain the difference in excited vibration mode between the axes along which there are to be vibrations. Further, because information such as the axis that is to vibrate and the machine position and the vibration mode are stored in association with each other, there is the effect that it is easier to understand the vibration characteristics of the machine structure.

Because the vibration mode determining apparatus 200 can cause vibration in an object to be measured using the motor 1 of the object itself and this vibration can be measured, a device to cause vibration in the to-be-measured apparatus is not needed as in, for example, an experiment mode analysis using an impulse hammer. In contrast, in the experiment mode analysis using an impulse hammer, the apparatus has to be repeatedly hit using an impulse hammer for all the measurement points; and, for example, if there are many measurement points, vibration has to be caused in the industrial machine (vibrated) many times while the position of the acceleration sensor is changed. Moreover, in the case of testing a large-scale industrial machine, in order to obtain a force (excitation force) that causes enough vibration, a large impact hammer needs to be used, which becomes laborious work for the person who performs the test. In contrast, with the vibration mode determining apparatus 200, the load on a person who performs the test can be greatly reduced.

Further, although there is a method which provides a vibration exciter instead of the impact hammer in an object to be measured so as to cause vibration, enough space in which to install the vibration exciter needs to be secured, and hence a vibration exciter cannot be installed in a small-scale industrial machine. Further, although the forms of vibration which a vibration exciter causes in an industrial machine can be different from the form of vibration when the industrial machine is actually driven by a motor, these problems can be resolved with the vibration mode determining apparatus 200.

REFERENCE SIGNS LIST 1, 1x, 1y, 1z Motor
2, 2x, 2y, 2z Feed screw
3, 3x, 3y, 3z Encoder
4 Work table
5 Column
6 Ram
7 Main spindle head
8 Coupling
9 Nut
10 Support bearing
11 Vibration command generating unit
12 Control unit
13 Acceleration sensor
14 Vibration mode calculating unit
15 Vibration mode output unit
16 Machine structure
17 Laser Doppler vibration meter
18 Measurement-point information input unit
19, 19x, 19y, 19z Motor drive device
21 Base
30 Sensor signal input IF
110 Vibration condition input unit
111 Vibration method deciding-on unit
112 Control parameter calculating unit
113 Vibration excitation signal generating unit
120 Instruction value distributing unit
121, 121x, 121y, 121z Position control unit
122, 122x, 122y, 122z Velocity control unit
122a Differential unit
122b Adder
122c Subtracter
122d PI control unit
123 Current value acquiring unit
124 Machine information transmitting unit
141 Transfer function calculating unit
142 Temporary storage area
143 Vibration mode identifying unit
200 Vibration mode determining apparatus.

The invention claimed is:

1. A vibration mode determining apparatus that determines a vibration mode of a machine structure of a machine including one or more motors, comprising:
   a three-axis vibration sensor that detects vibration of the machine structure; and
   circuitry configured to
      generate a vibration command for the motor;
      generate a current command for the motor according to the vibration command and output a conversion value for a motor excitation force;
      drive the motor according to the current command;
      set a coordinate of each of a plurality of measurement points of the machine structure and a sensor direction indicating an orientation of the three-axis vibration sensor, the three-axis vibration sensor being attached to one of the plurality of measurement points of the machine structure; and
      determine the vibration mode based on the conversion value for the motor excitation force, the vibration of the machine structure, the coordinate of the one of the plurality of measurement points of the machine structure, and the sensor direction, wherein
   an order of input channels of the three-axis vibration sensor for x, y, and z directions of the machine is changed in accordance with the sensor direction, and
   the determined vibration mode is represented by a reference coordinate of the one of the plurality of measurement points of the machine structure and a displacement from the reference coordinate, the displacement being determined based on the conversion value for the motor excitation force.

2. The vibration mode determining apparatus according to claim 1, wherein
the circuitry is further configured to calculate a transfer function based on the coordinate of the one of the plurality of measurement points of the machine structure and the sensor direction.

3. The vibration mode determining apparatus according to claim 1, wherein the circuitry is further configured to output an animation image or a still image representing the vibration.

4. The vibration mode determining apparatus according to claim 1, wherein
the coordinate of each of the plurality of measurement points of the machine structure includes three-dimensional coordinate values.

5. The vibration mode determining apparatus according to claim 1, wherein the vibration mode is determined by curve-fitting.

6. The vibration mode determining apparatus according to claim 1, wherein the vibration mode is determined by identifying a plurality of parameters, the plurality of parameters including a natural frequency and a mode attenuation ratio.

7. The vibration mode determining apparatus according to claim 1, further comprising:

a plurality of three-axis vibration sensors including the three-axis vibration sensor, wherein each of the plurality of three-axis vibration sensors is attached to one of the plurality of measurement points of the machine structure; and the circuitry is further configured to set a sensor direction for each of the plurality of three-axis vibration sensors, and determine the vibration mode based on the conversion value for the motor excitation force, the vibration of the machine structure, the coordinate of the one of the plurality of measurement points of the machine structure, and the sensor direction of each of the plurality of three-axis vibration sensors.

8. The vibration mode determining apparatus according to claim 1, wherein the circuitry is further configured to calculate a plurality of transfer functions based on the coordinate of each of the plurality of measurement points and store the plurality of transfer functions in a temporary storage.

9. A vibration mode determining apparatus that determines a vibration mode of a machine structure of a machine including one or more motors, comprising:

a three-axis vibration sensor that detects vibration of the machine structure;

circuitry configured to generate a vibration command for the motor;

generate a current command for the motor according to the vibration command, output a conversion value for a motor excitation force, and output machine information about a state or position of the machine;

drive the motor according to the current command;

set a coordinate of each of a plurality of measurement points of the machine structure and a sensor direction indicating an orientation of the three-axis vibration sensor, the three-axis vibration sensor being attached to one of the plurality of measurement points of the machine structure; and determine the vibration mode based on the conversion value for the motor excitation force, the vibration of the machine structure, the coordinate of the one of the plurality of measurement points of the machine structure, and the sensor direction and store the machine information and the vibration mode in association with each other, wherein an order of input channels of the three-axis vibration sensor for x, y, and z directions of the machine is changed in accordance with the sensor direction, and the determined vibration mode is represented by a reference coordinate of the one of the plurality of measurement points of the machine structure and a displacement from the reference coordinate, the displacement being determined based on the conversion value for the motor excitation force.

10. The vibration mode determining apparatus according to claim 9, wherein the circuitry is further configured to calculate a transfer function based on the coordinate of the one of the plurality of measurement points of the machine structure and the sensor direction.

11. The vibration mode determining apparatus according to claim 9, wherein the vibration sensor is an acceleration sensor, a velocity sensor, or a displacement sensor.

12. The vibration mode determining apparatus according to claim 9, wherein the machine information is a combination of any one of or all of a position of the machine, an atmospheric temperature, a temperature of the machine, and a mass of an object.

13. The vibration mode determining apparatus according to claim 9, wherein the circuitry is further configured to output an animation image or a still image representing the vibration.

14. The vibration mode determining apparatus according to claim 9, wherein the coordinate of each of the plurality of measurement points of the machine structure includes three-dimensional coordinate values.

15. The vibration mode determining apparatus according to claim 9, wherein the circuitry is further configured to calculate a plurality of transfer functions based on the coordinate of each of the plurality of measurement points and store the plurality of transfer functions in a temporary storage.

16. A vibration mode determining apparatus that determines a vibration mode of a machine structure of a machine including one or more motors, comprising:

a sensor signal acquiring interface that acquires a signal from an external sensor;

circuitry configured to generate a vibration command for the motor;

generate a current command for the motor according to the vibration command and output a conversion value for a motor excitation force;

drive the motor according to the current command;

set a coordinate of each of a plurality of measurement points of the external sensor connected to the sensor signal acquiring interface; and determine the vibration mode based on the conversion value for the motor excitation force, the sensor signal acquired by the sensor signal acquiring interface, and the coordinate of one of the plurality of measurement points of the external sensor, wherein the determined vibration mode is represented by a reference coordinate of the one of the plurality of measurement points of the external sensor and a displacement from the reference coordinate, the displacement being determined based on the conversion value for the motor excitation force.

17. The vibration mode determining apparatus according to claim 16, wherein the circuitry is further configured to calculate a transfer function based on the coordinate of the one of the plurality of measurement points of the external sensor.

18. The vibration mode determining apparatus according to claim 16, wherein the vibration command is a velocity command for the motor.

19. The vibration mode determining apparatus according to claim 16, wherein the vibration command is the current command for controlling a current flowing through the motor.

20. The vibration mode determining apparatus according to claim 16, wherein the circuitry is further configured to output an animation image or a still image representing the vibration.

21. The vibration mode determining apparatus according to claim 16, wherein the coordinate of each of the plurality of measurement points of the machine structure includes three-dimensional coordinate values.

22. The vibration mode determining apparatus according to claim 16, wherein
the circuitry is further configured to determine a target axis with vibrations, a type of the vibration command, and control-parameter values to be set during vibration excitation on the basis of input vibration conditions.

* * * * *